US008428568B1

(12) United States Patent
Kim

(10) Patent No.: US 8,428,568 B1
(45) Date of Patent: Apr. 23, 2013

(54) APPARATUS AND METHOD FOR PROVIDING ADDITIONAL CALLER ID INFORMATION

(75) Inventor: Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/602,994

(22) Filed: Sep. 4, 2012

Related U.S. Application Data

(60) Provisional application No. 61/657,044, filed on Jun. 8, 2012.

(30) Foreign Application Priority Data

Jul. 19, 2012 (KR) ................... 10-2012-0078750

(51) Int. Cl.
*H04M 3/42* (2006.01)
*H04B 1/38* (2006.01)

(52) U.S. Cl.
USPC ............................. 455/415; 455/566; 455/567

(58) Field of Classification Search .................. 455/415, 455/566, 567
See application file for complete search history.

(56) References Cited

U.S. PATENT DOCUMENTS

| 7,860,489 | B2 | 12/2010 | Kuhl et al. | |
|---|---|---|---|---|
| 8,224,304 | B2 * | 7/2012 | Gatti et al. | 455/415 |
| 2001/0012347 | A1 | 8/2001 | Fujino et al. | |
| 2005/0138564 | A1 * | 6/2005 | Fogg | 715/745 |
| 2005/0202844 | A1 * | 9/2005 | Jabri et al. | 455/556.1 |
| 2006/0135139 | A1 * | 6/2006 | Cheng et al. | 455/418 |
| 2006/0139319 | A1 * | 6/2006 | Kariathungal et al. | 345/156 |
| 2006/0256083 | A1 | 11/2006 | Rosenberg | |
| 2008/0084975 | A1 | 4/2008 | Schwartz | |
| 2009/0023472 | A1 * | 1/2009 | Yoo et al. | 455/556.1 |
| 2009/0239579 | A1 * | 9/2009 | Lee et al. | 455/556.1 |
| 2010/0061197 | A1 * | 3/2010 | Yoshikawa et al. | 369/1 |
| 2010/0061532 | A1 | 3/2010 | Takiguchi | |
| 2010/0203874 | A1 * | 8/2010 | Scott et al. | 455/415 |
| 2010/0250816 | A1 | 9/2010 | Collopy et al. | |
| 2011/0021182 | A1 * | 1/2011 | Huan | 455/414.1 |
| 2011/0181774 | A1 * | 7/2011 | Masuda | 348/473 |
| 2012/0220338 | A1 * | 8/2012 | Degrazia et al. | 455/556.1 |
| 2012/0225697 | A1 * | 9/2012 | Lee et al. | 455/566 |
| 2012/0239673 | A1 * | 9/2012 | Yun et al. | 707/758 |
| 2012/0242840 | A1 * | 9/2012 | Nakfour et al. | 348/207.1 |

FOREIGN PATENT DOCUMENTS

| EP | 0 959 638 A2 | 11/1999 |
|---|---|---|
| KR | 10-2009-0096111 A | 9/2009 |

* cited by examiner

*Primary Examiner* — Christopher M Brandt
(74) *Attorney, Agent, or Firm* — Birch, Stewart, Kolasch & Birch, LLP

(57) ABSTRACT

A portable device and a method for controlling the same are disclosed, in which additional data of caller ID are displayed. The method for controlling a portable device comprises the steps of receiving an incoming call, detecting a user's face on the portable device, displaying additional data on the incoming call if the user's face is detected, the additional data being some of a plurality of additional data collected from a plurality of data sources to correspond to caller ID of the incoming call, displaying other additional data included in the collected additional data per predetermined time interval if the user's face is continuously detected, and detecting a user input for answering or rejecting the incoming call.

24 Claims, 11 Drawing Sheets

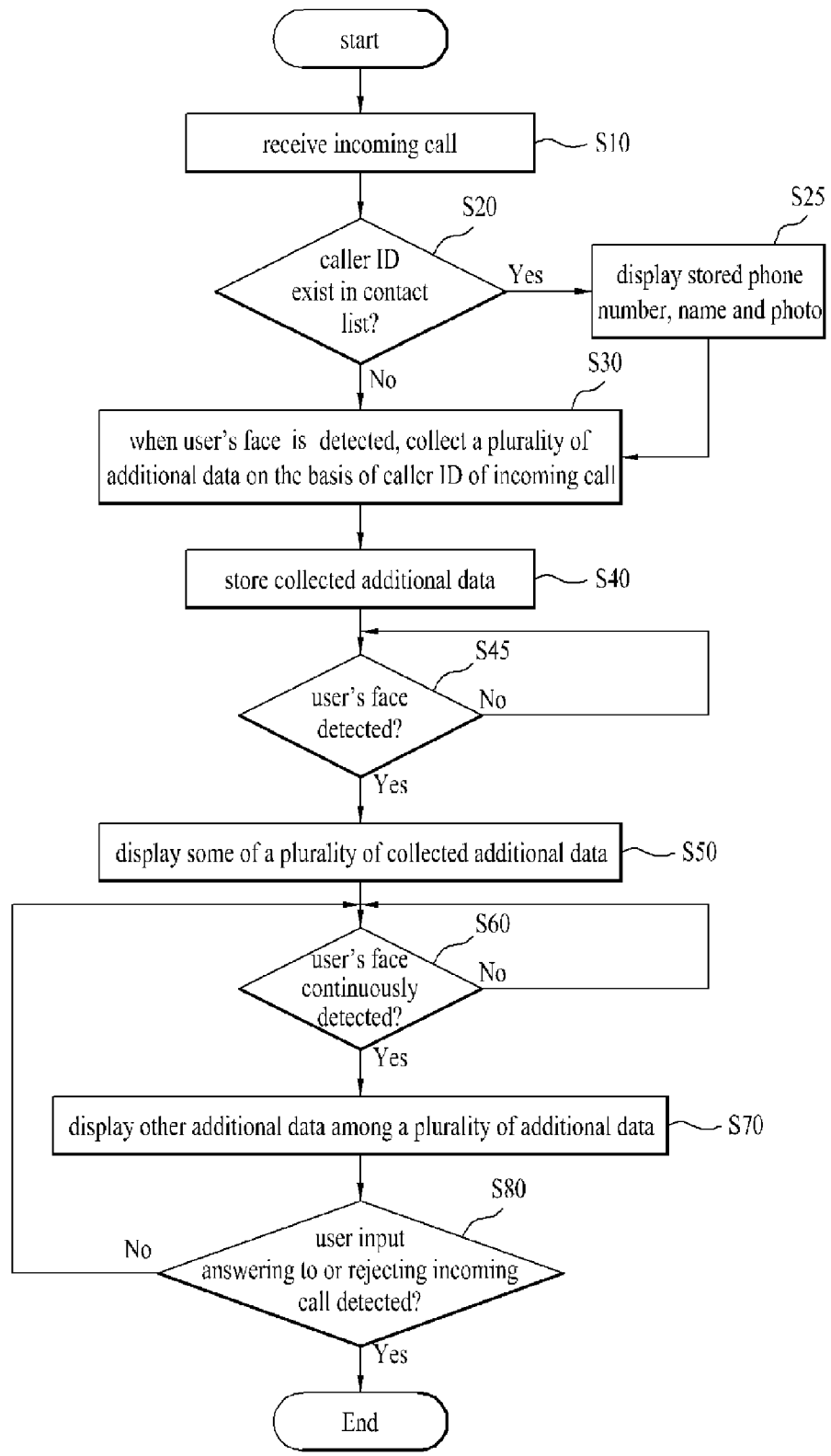

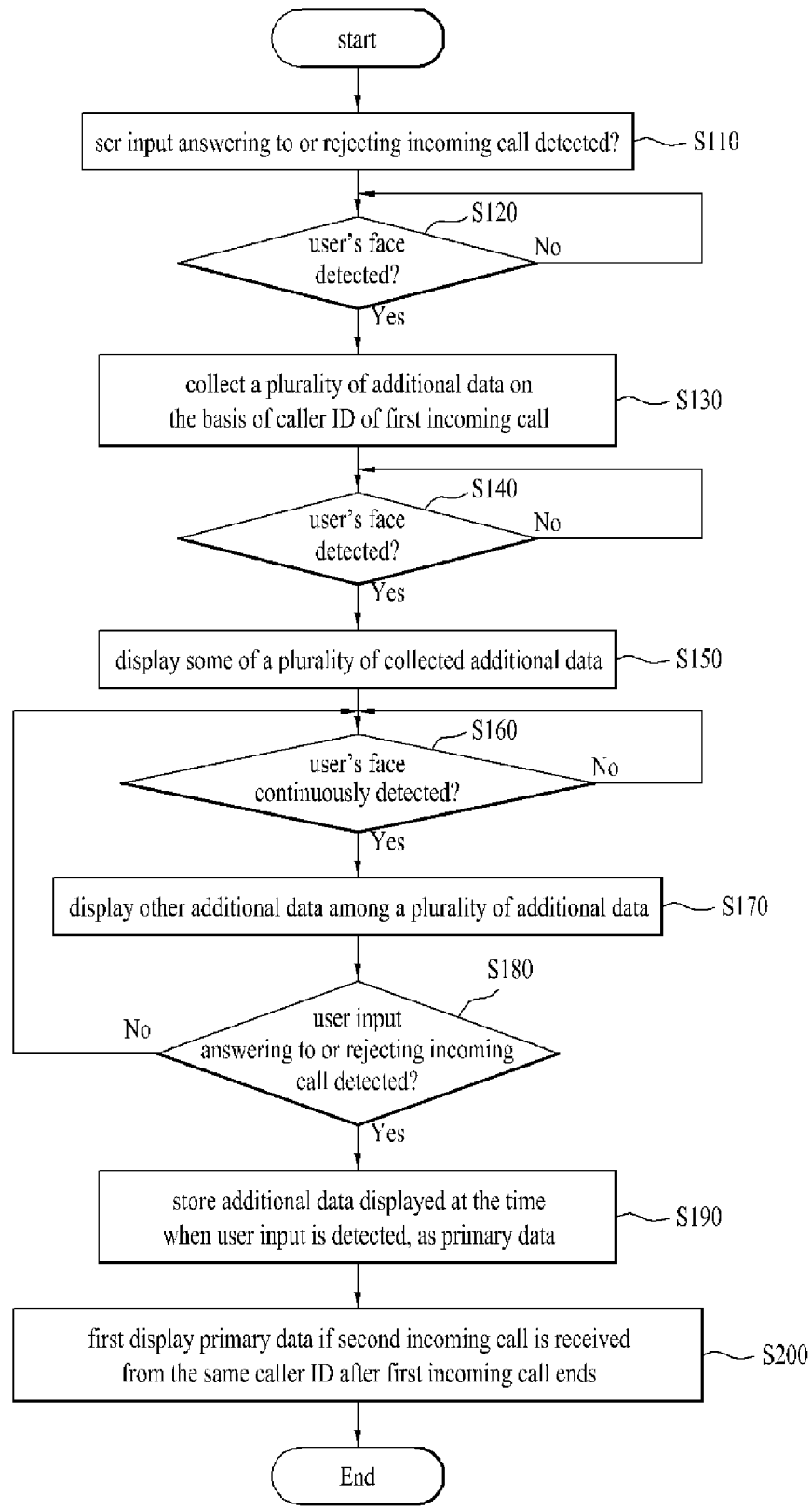

APPARATUS AND METHOD FOR PROVIDING ADDITIONAL CALLER ID INFORMATION

This application claims the benefit of the U.S. Patent Application No. 61/657,044, filed on Jun. 8, 2012, and the Korean Patent Application No. 10-2012-0078750, filed on Jul. 19, 2012 which are hereby incorporated by reference as if fully set forth herein.

BACKGROUND OF THE INVENTION

1. Field of the Invention

The present invention relates to a portable device, and more particularly, to a portable device and a method for controlling the same, in which additional data of caller ID are displayed.

2. Discussion of the Related Art

As use of a portable device has been increased, users have used various services, such as web surfing and electronic financial transaction as well as personal communication and music listening, by using the portable device. Examples of personal communication may include a phone call and text message transmission and reception. In case of the phone call, a user may decide whether to answer to an incoming call when the incoming call is received from the other party. Since the portable device provides caller ID to the user who has received the incoming call, the user may decide whether to answer to the call by identifying the caller ID.

However, since the caller ID provided by the portable device according to the related art includes a phone number only, a problem occurs in that information on the incoming call is not sufficient when the user decides whether to answer to the incoming call. Accordingly, the portable device needs to collect various kinds of additional data on the basis of the caller ID and provide the collected additional data to the user.

SUMMARY OF THE INVENTION

Accordingly, the present invention is directed to a portable device and a method for controlling the same, which substantially obviate one or more problems due to limitations and disadvantages of the related art.

An object of the present invention is to provide a portable device that collects additional data on caller ID and provides the collected additional data to a user, and that is required to edit the additional data in accordance with feedback of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a portable device comprises the steps of receiving an incoming call, detecting a user's face on the portable device, displaying additional data on the incoming call when the user's face is detected, the additional data being some of a plurality of additional data collected from a plurality of data sources to correspond to caller ID of the incoming call, displaying other additional data included in the collected additional data per predetermined time interval when the user's face is continuously detected, and detecting a user input answering to or rejecting the incoming call.

In another aspect of the present invention, a method for controlling a portable device comprises the steps of receiving a first incoming call, detecting a user's face on the portable device, displaying additional data on the first incoming call when the user's face is detected, the additional data being some of a plurality of additional data collected to correspond to caller ID of the first incoming call, displaying other additional data included in the collected additional data per predetermined time interval when the user's face is continuously detected, detecting a user input answering to or rejecting the first incoming call, storing additional data displayed at the time when the user input is detected, among the plurality of displayed additional data, as primary data, and first displaying the primary data when a second incoming call is received from the caller ID after the first incoming call ends.

In still another aspect of the present invention, a portable device comprises a communication unit transmitting and receiving digital data to and from a network by accessing the network, a storage unit storing the digital data, a sensor unit detecting a user's face on the portable device, a display unit displaying the digital data, and a controller controlling the units, wherein the portable device receives an incoming call, detects the user's face on the portable device, displays additional data on the incoming call when the user's face is detected, the additional data being some of a plurality of additional data collected from a plurality of data sources to correspond to caller ID of the incoming call, displays other additional data included in the collected additional data per predetermined time interval when the user's face is continuously detected, and detects a user input answering to or rejecting the incoming call.

In further still another aspect of the present invention, a portable device comprises a communication unit transmitting and receiving digital data to and from a network by accessing the network, a storage unit storing the digital data, a sensor unit detecting a user's face on the portable device, a display unit displaying the digital data, and a controller controlling the units, wherein the portable device receives a first incoming call, detects the user's face on the portable device, displays additional data on the first incoming call when the user's face is detected, the additional data being some of a plurality of additional data collected to correspond to caller ID of the incoming call, displays other additional data included in the collected additional data per predetermined time interval when the user's face is continuously detected, detects a user input answering to or rejecting the incoming call, stores additional data displayed at the time when the user input is detected, among the plurality of displayed additional data, as primary data, and first displays the primary data when a second incoming call is received from the caller ID after the first incoming call ends.

According to the present invention, the portable device may provide additional data on the caller ID of the incoming call.

Also, according to the present invention, the portable device may provide additional data on the caller ID to prevent displayed additional data from being missed by the user when the incoming call is received and the user's face is detected.

Also, according to the present invention, the portable device may collect data of website, SNS, and external data base through the network and provide the collected data as additional data on the caller ID when the incoming call is received.

Also, according to the present invention, the portable device may rank data sources of additional data, which allow the user to decide whether to answer to the call, thereby determining a display order of the additional data.

Also, according to the present invention, the portable device may store additional data, which allow the user to decide whether to answer to a previous incoming call, and may provide the stored additional data when an incoming call is newly received from the caller ID the same as that of the previous incoming call.

Also, according to the present invention, the portable device may extract a keyword by recognizing a call message of the user through voice recognition and provide the extracted keyword as additional data.

Also, according to the present invention, the portable device may collect additional data when an incoming call is received and the user's face is detected, thereby preventing unnecessary additional data from being collected.

Also, according to the present invention, the portable device may determine a time interval for which each of additional data is displayed to correspond to timing between the time when an incoming call is received and the time when the user's face is detected.

Also, according to the present invention, the portable device may determine the number of additional data displayed at the same time to correspond to timing between the time when an incoming call is received and the time when the user's face is detected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates a method for controlling a portable device in accordance with one embodiment of the present invention; and FIG. 10 illustrates a method for controlling a portable device in accordance with another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The embodiments of the present invention shown in the accompanying drawings and described by the drawings are only exemplary, and technical spirits of the present invention and its main operation are not limited by such embodiments.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

The portable device of the present invention may collect additional data corresponding to caller ID of an incoming call from a plurality of data sources and display the collected additional data. The plurality of data sources may include a contact list, a call history, a message history, a schedule, e-mail, a data base connected to a network, a website, and SNS.

Figure 1A:
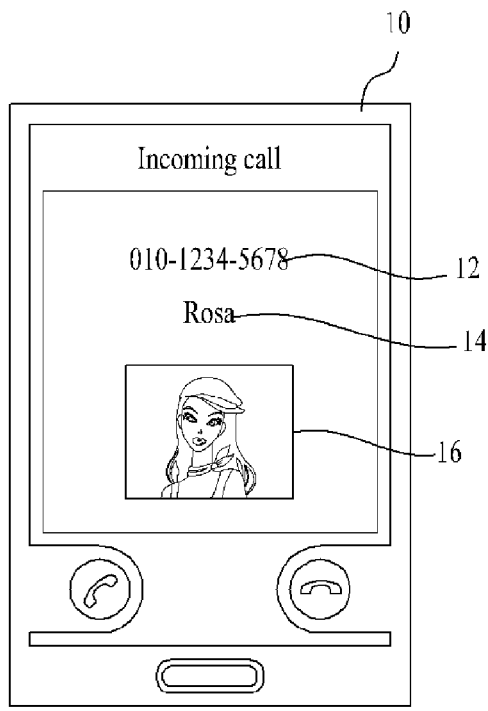
FIGS. 1A and 1B illustrate a method for displaying additional data on caller ID according to one embodiment of the present invention.

FIG. 1 is a diagram illustrating a method for displaying additional data on caller ID according to one embodiment of the present invention. When an incoming call is received, the portable device may display additional data on the basis of caller ID of the incoming call. The caller ID means information that may identify a caller, and may include a phone number of the caller in accordance with the embodiment. The portable device may search for a contact list stored in its storage unit and display additional data, which are matched with the caller ID, together with the caller ID. The additional data which are displayed may include a phone number corresponding to the caller ID, a caller's name, and photos. Moreover, the additional data may include address, e-mail, schedule, and memo. The portable device may extract keywords of the e-mail, the schedule, and the memo and display the extracted keywords as the additional data. A source that may extract the additional data may be referred to as a data source. For example, as shown in FIG. 1A, if data on the caller ID of the incoming call are stored in the portable device, the portable device may display a phone number 12 corresponding to the caller ID, a caller name 14, and a photo 16. A user may acquire information on the caller of the incoming call through the displayed additional data, and may decide whether to answer to the incoming call.

Figure 1B:
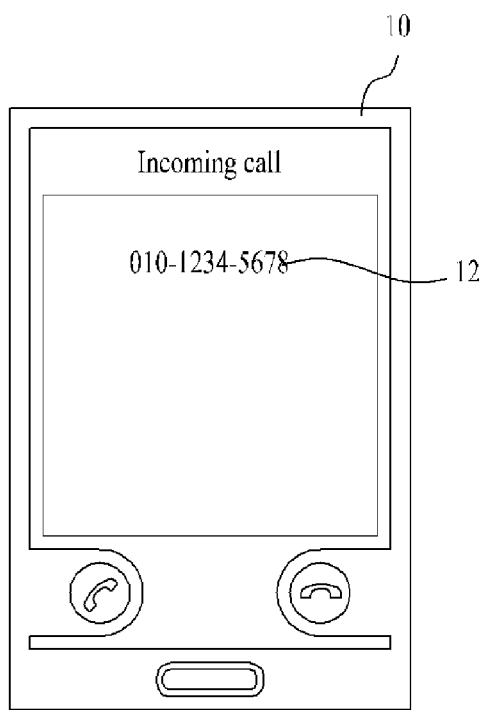

If the data on the caller ID of the incoming call do not exist in the portable device, the portable device may display the phone number 12 only corresponding to the caller ID as shown in FIG. 1B. In this case, it is difficult for the user to know who the caller is, through the phone number 12 only corresponding to the caller ID. For this reason, the user has a difficulty in determining whether to answer to or reject the incoming call, and may need additional data.

Figure 2A:
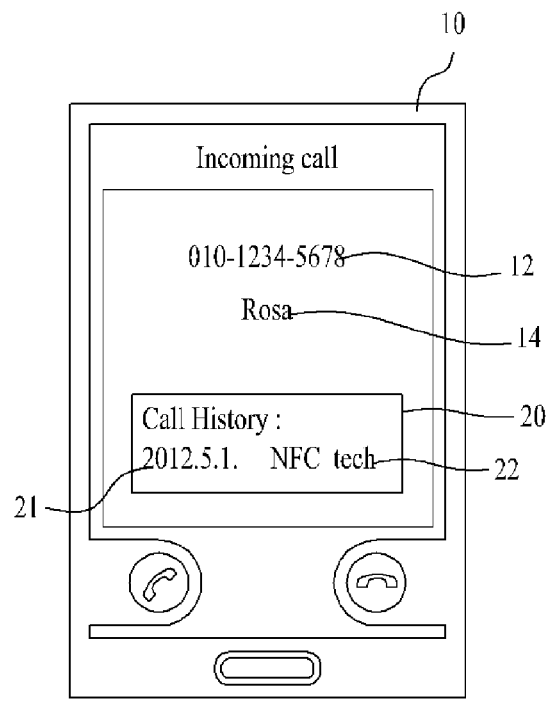
FIGS. 2A and 2B illustrate a method for displaying a call history message and message history data as additional data in accordance with one embodiment of the present invention.

FIG. 2 is a diagram illustrating a method for displaying call history message and message history data as additional data in accordance with one embodiment of the present invention. As shown in FIG. 2A, when an incoming call is received, the portable device 10 may display a phone number 12 and a caller name 14, which correspond to caller ID of the incoming call, and may display additional data 20 extracted from a call history which is one of data sources on the corresponding caller ID. The name 14 of the incoming call may be displayed when data corresponding to the caller ID of the incoming call exist in the contact list of the portable device, and may not be displayed if not so. The call history may include calling date 21, calling time, and calling hours. Also, the call history may include a keyword extracted from a previous call message.

The portable device may recognize call messages of the user for incoming calls and outgoing calls through voice recognition. The portable device may extract a keyword from voice-recognized call messages by using the natural language processing technology. The portable device may extract a keyword through context analysis, syntax analysis, and talking analysis for the call messages, or may extract the most frequently mentioned one of words mentioned by the user during calling as a keyword. The portable device may store the keyword extracted from the call messages together with a call history of the caller ID. In other words, the portable device may store a keyword extracted from the call messages together with a call history for the caller ID of the incoming call. When another incoming call is later received from the same caller ID, the portable device may display the keyword stored together with the call history for the corresponding caller ID. Accordingly, the portable device may remind the user of a previous call message with the corresponding caller ID, and the user may decide whether to answer to or reject the incoming call on the basis of the previous call message.

Figure 2B:
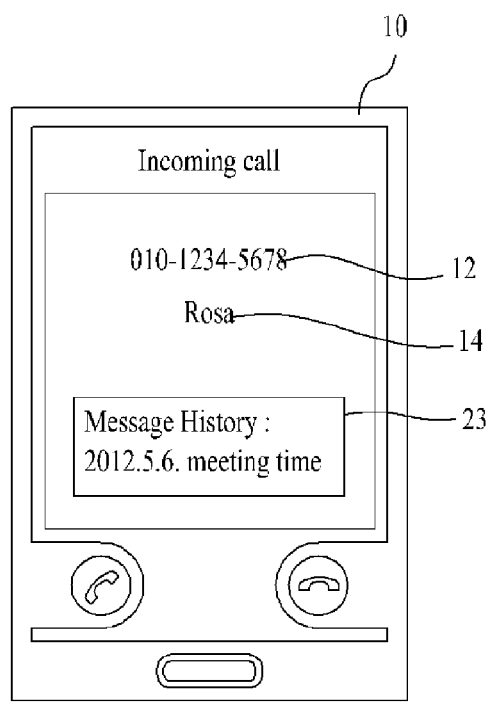

FIG. 2B illustrates a method for displaying message history data as additional data. When an incoming call is received, the portable device 10 may display a phone number 12 and a caller name 14, which correspond to caller ID of the corresponding incoming call, and may display additional data extracted from a message history which is one of data sources on the corresponding caller ID. The name 14 of the incoming call may be displayed when data corresponding to the caller ID of the incoming call exist in the contact list of the portable device, and may not be displayed if not so.

The message history may include sent or received date 21 or time of a message. Also, the message history may include the full text of messages previously sent and received, or may include a keyword extracted from the message. In this case, the message may include a message based on a short messaging service (SMS) and a multimedia messaging service (MMS). The portable device may remind the user of a message previously sent to and received from the corresponding caller ID, and the user may determine whether to answer to or reject the incoming call on the basis of the previous message.

Figure 3A:
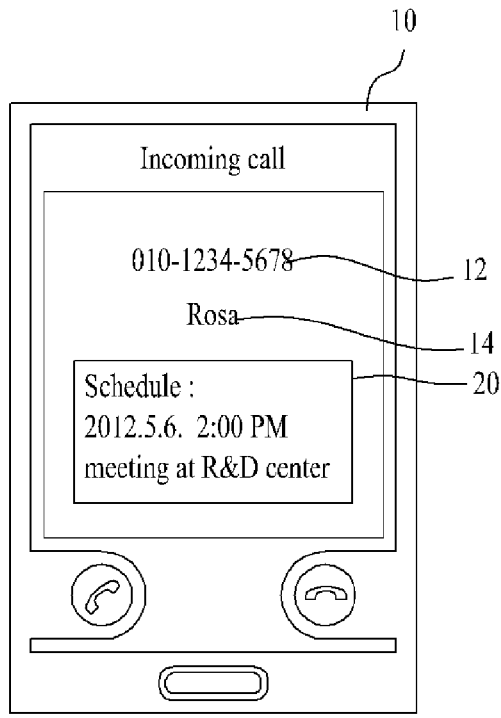
FIGS. 3A and 3B illustrate a method for displaying schedule data and email data as additional data in accordance with one embodiment of the present invention.

FIG. 3 is a diagram illustrating a method for displaying schedule data and e-mail data as additional data in accordance with one embodiment of the present invention. As shown in FIG. 3A, when an incoming call is received, the portable device 10 may display a phone number 12 and a caller name 14, which correspond to caller ID of the corresponding incoming call, and may also display schedule data 30 on the corresponding caller ID as the additional data. The name 14 of the incoming call may be displayed when data corresponding to the caller ID of the incoming call exist in the contact list of the portable device, and may not be displayed if not so.

The schedule data may include a scheduled time, a scheduled message, and a scheduled place with the corresponding caller ID. The portable device may search for the schedule data stored therein by using basic additional data such as caller ID, phone number and name of the incoming call. The portable device may search for a schedule matched with corresponding caller ID and name from the schedule data stored therein and display the searched schedule as the additional data. The portable device may provide the schedule data to the user before the user decides to answer to or reject the incoming call, whereby the portable device may remind the user of the schedule and the user may carry out the schedule with the other caller party without an error.

Figure 3B:
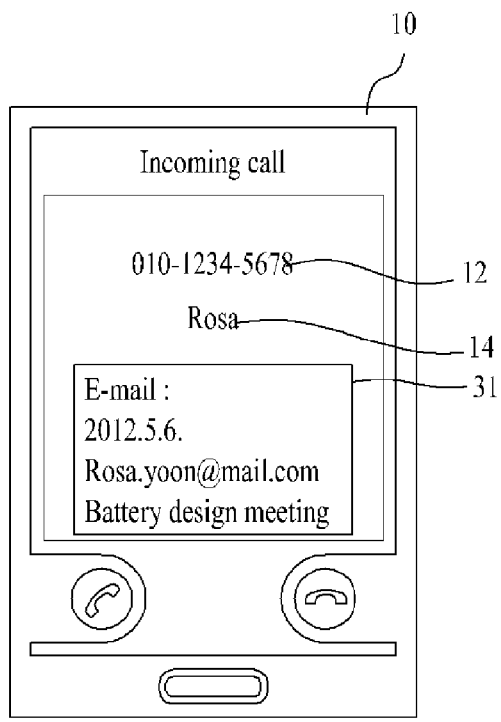

FIG. 3B illustrates a method for displaying e-mail data as additional data in accordance with one embodiment of the present invention. When an incoming call is received, the portable device 10 may display a phone number 12 and a caller name 14, which correspond to caller ID of the corresponding incoming call, and may also display e-mail data 31 on the corresponding caller ID as the additional data. The name 14 of the incoming call may be displayed when data corresponding to the caller ID of the incoming call exist in the contact list of the portable device, and may not be displayed if not so.

The e-mail data may include an e-mail address, an e-mail message, and an e-mail received time of the corresponding caller ID. The portable device may search for the e-mail data stored therein by using basic additional data such as caller ID, phone number and name of the incoming call. The portable device may search for an e-mail address or an e-mail message, which is matched with the name 14 of the corresponding caller ID from the e-mail data stored therein and display the searched e-mail data as the additional data. The portable device may provide the e-mail data to the user before the user decides to answer to or reject the incoming call, whereby the portable device may remind the user of the e-mail message recently sent to or received from the other party.

FIG. 4 is a diagram illustrating a method for displaying additional data collected by searching for a network in accordance with one embodiment of the present invention. When an incoming call is received, the portable device may search for a network connected thereto through wire or wireless, on the basis of caller ID of the corresponding incoming call, and may collect the additional data on the caller ID. The network may include a server that is connected with the portable device and provides e-mail, schedule, calendar, call history and message history. The portable device may collect the additional data through network search even in the case that the additional data on the corresponding caller ID exist in a storage unit as well as the case that the additional data do not exist in the storage unit. The portable device may search for the network on the basis of the additional data on the corresponding caller ID stored in the storage unit and collect the additional data.

The portable device may access a data base that manages spam calls and unwanted calls through the network connected with the portable device through wire or wireless. The spam calls are incoming calls which are not desired by the user and may mean calls intended for advertisements, etc. In this case, the data base may include a server, an external storage unit and a website, which are connected with the network. The data base that manages spam calls may provide caller IDs and keywords of the spam calls. The portable device may search for data as to whether the caller ID of the incoming call is matched with the caller IDs of the spam calls. Also, if the caller ID of the spam, which is matched with the caller ID of the incoming call, exists, the portable device may collect keywords of the corresponding spam call.

Figure 4A:
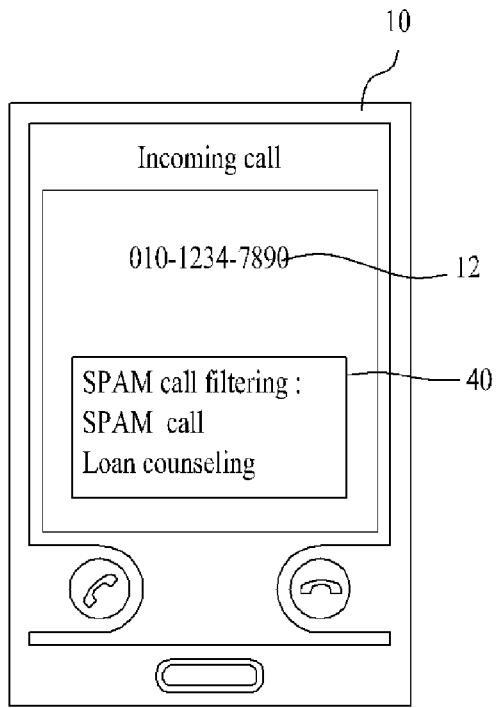
FIGS. 4A, 4B and 4C illustrate a method for displaying additional data collected by searching for a network in accordance with one embodiment of the present invention.

The portable device, as shown in FIG. 4A, may display the data as to the spam calls and the keywords of the spam calls as a search result 40 of the spam calls. For example, the portable device may search for the data base with respect to a phone number '010-1234-7890' corresponding to caller ID of the incoming call. As a result, if the corresponding caller ID is matched with caller ID of a spam call that guides loan counseling, the portable device may display 'SPAM call, Loan counseling' in the spam call search result 40. As a result, the user may know whether the incoming call is a spam call and intention of the spam call, and may decide to answer to or reject the corresponding incoming call.

Figure 4B:
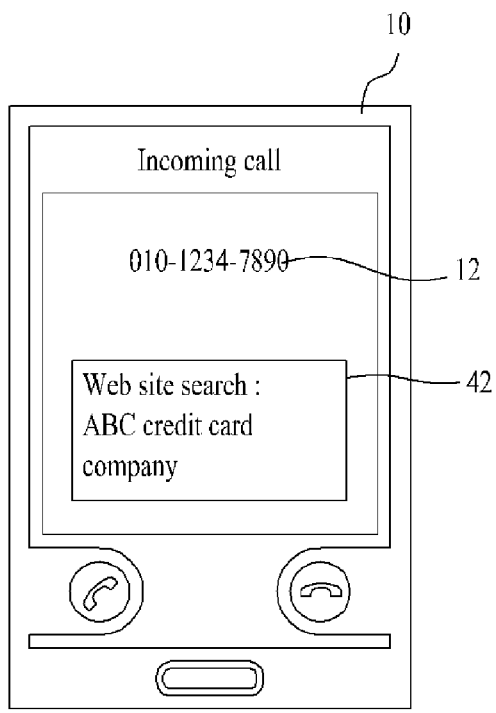

The portable device may access a website, which includes caller ID of the incoming call, through the network connected thereto through wire or wireless. In this case, the website may include a web page that lists the search result of the corresponding incoming call in a homepage of a company and a portal site. The portable device may extract a keyword from the accessed website and display a website search result together with the phone number 12 corresponding to the caller ID as the additional data. For example, as shown in FIG. 4B, the portable device may search for the website with respect to the caller ID '010-1234-7890' of the incoming call. As a result of the website search, if the corresponding caller ID is searched as a main phone number of a credit card company, the portable device may display 'ABC credit card company' in the website search result 42. The user may know that the incoming call has been sent from the corresponding company, through the website search result provided by the portable device. As a result, the user may decide whether to answer to the corresponding incoming call.

Figure 4C:
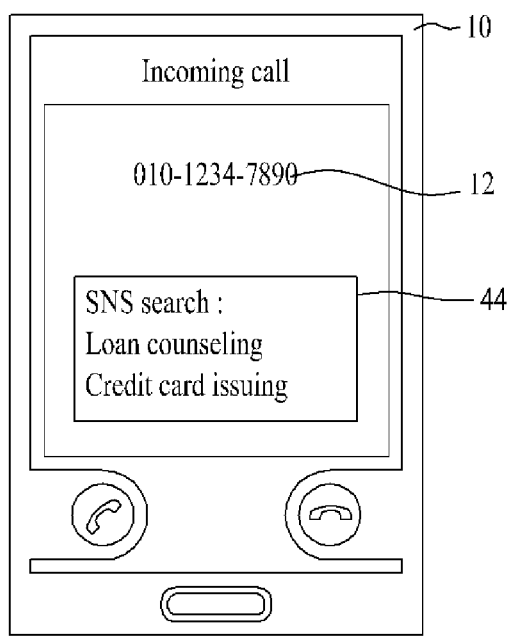

Also, as shown in FIG. 4C, the portable device may display a search result 44 of a social network service (SNS) through the network connected thereto through wire or wireless, as the additional data. When the incoming call is received, the portable device may search for the SNS on the basis of the additional data on the corresponding caller ID stored in the portable device and the phone number 12 corresponding to the caller ID of the corresponding incoming call. The portable device may collect and display information drafted by the other user, existing on the SNS. For example, when the other user uploads data, which include 'loan counseling' and 'credit card issuing', on the social network service with respect to the caller ID '010-1234-7890', the portable device may search for the uploaded data and display the searched result as shown in FIG. 4C. As a result, an opinion of the other user on the corresponding incoming call may be provided to the corresponding user, whereby the corresponding user may decide whether to answer to the incoming call.

As described above, the portable device may collect the additional data on the caller ID through the data base, the website, the social network service, etc., which are connected thereto through wire or wireless. Also, the additional data collected by each network may be used again to search for other network. For example, the additional data 'ABC credit card company' obtained through website search may be used together with the caller ID '010-1234-7890' in searching for the social network service.

Figure 5:
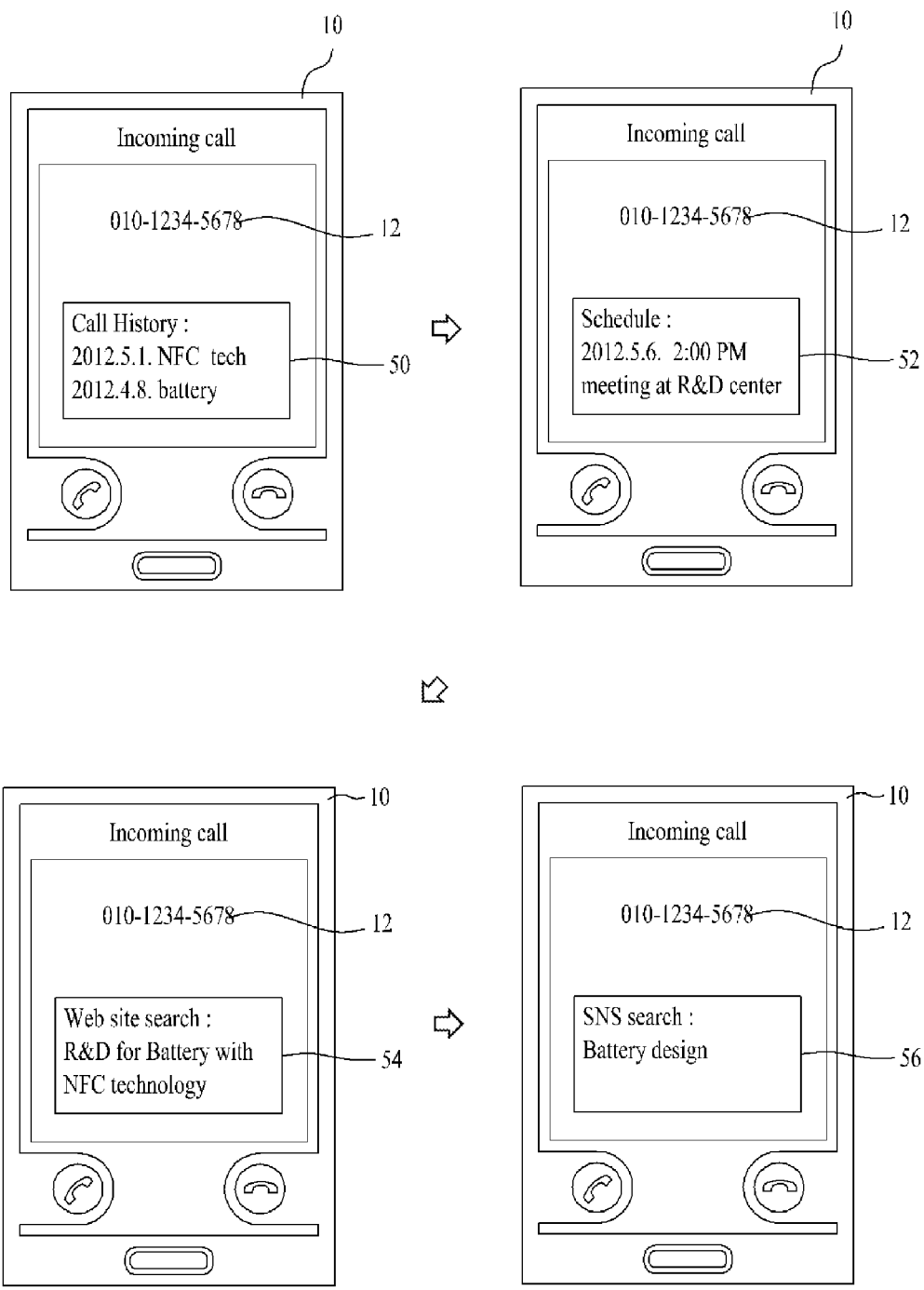
FIG. 5 illustrates a method for displaying additional data in accordance with one embodiment of the present invention.

FIG. 5 is a diagram illustrating a method for displaying additional data in accordance with one embodiment of the present invention. The portable device may search for at least one of the storage unit included therein and the network connected thereto, and may collect additional data on caller ID of the incoming call, as described above. The portable device may store the additional data collected from a plurality of sources in an additional data group corresponding to the corresponding caller ID. The additional data group means a separate storage place generated per caller ID, and may sort the collected additional data per caller ID and store the sorted data.

When the user's face is detected, the portable device may sequentially display the plurality of additional data stored in the additional data group until the user decides whether to answer to the incoming call. The portable device may detect the user's face by tracking the user's gaze or recognizing the user's face. The user may decide whether to answer to the incoming call on the basis of the displayed additional data. Since the portable device displays the additional data after detecting the user's face, it is possible to prevent the user from missing the additional data.

In FIG. 5, the portable device 10 may display the phone number 12 and the additional data corresponding to the caller ID. The portable device may change the displayed additional data to other additional data and display the changed additional data. When two conditions of the user's face condition and timing condition are satisfied, the portable device may change the displayed additional data. Hereinafter, time interval means the time when each of the additional data is displayed.

The user's face condition may include whether the user's face is continuously detected, and the timing condition may include whether a predetermined time interval has passed. When the user's face is detected and the predetermined time interval passes, the portable device may change the displayed additional data to other additional data. When the user's face is not detected continuously even though the timing condition is satisfied, the portable device may maintain the displayed additional data without any change. Also, the portable device may maintain the displayed additional data for the predetermined time interval even though the user's face is detected. The portable device may change the displayed additional data only if the user's face is detected and the predetermined time interval passes, whereby the portable device may provide the collected additional data to the user without missing.

The aforementioned timing condition may set the predetermined time interval differently depending on the amount of each of the additional data. In other words, the portable device may increase the predetermined time interval when the amount of the additional data is great, whereas it may reduce the same when the amount of the additional data is small, whereby the portable device may variably set the time when each of the additional data is displayed.

Also, the portable device may set the aforementioned time interval to correspond to the timing from the time when the portable device receives the incoming call up to the time when the user's face on the portable device is detected. The portable device may set the time interval for a short time if the timing from the time when the incoming call is received up to the time when the user's face is detected is long. Also, the portable device may set the time interval for a long time if the timing from the time when the incoming call is received up to the time when the user's face is detected is short. In other words, the portable device may set the time interval inversely proportional to the timing from the time when the incoming call is received up to the time when the user's face is detected. The incoming call may be ended by the caller at any time until the user decides whether to answer to the incoming call. Accordingly, the portable device may quickly display the collected additional data if the timing from the time when the incoming call is received up to the time when the user's face is detected becomes long, whereby more additional data may be provided to the user.

For example, the portable device may collect additional data corresponding to the caller ID through call history search, schedule search, website search and SNS search. When the user's face is continuously detected, the portable device may change the displayed additional data per predetermined time interval as shown in FIG. 5. The display order of the additional data may be based on the following embodiment.

According to one embodiment of the display order, the portable device may display the additional data collected from the network after first displaying the additional data collected from the storage unit. The portable device may display additional data 50 collected from the call history. The additional data collected from the call history may include a keyword extracted from the calling date and the calling message. After the portable device displays the additional data collected from the call history, if the user's face condition and the timing condition are satisfied, the portable device may display additional data 52 collected from the schedule. Similarly, if the user's face condition and the timing condition are satisfied, the portable device may display the additional data 54 collected from the website search and the additional data 56 collected from SNS search per predetermined time interval in due order.

According to another embodiment of the display order, the portable device may display the additional data in accordance with priority of each data source. The portable device may accumulate and count the number of collected times of primary data, which are collected from each data source, per data source. The primary data means additional data displayed at the time when a user input answering to or rejecting the incoming call is detected. In other words, the primary data may be a basis for determining whether to receive the incoming call.

The portable device may count the number of collected times of primary data on all the incoming calls regardless of caller IDs of the incoming calls. The portable device may determine priority of the data sources in the order of the higher counting values accumulated per data source. The portable device may determine the display order of the additional data collected from each data source in accordance with the determined priority of the data sources. In this case, the portable device may determine the priority of the data source of additional data preferred by the user when the user decides whether to answer to the incoming call. Accordingly, the portable device may first display the additional data preferred by the user, so that the user may quickly decide whether to answer to the incoming call.

Also, the portable device may change the time interval for displaying the additional data collected from the corresponding data source in accordance with the priority of each data source. In other words, the portable device may set the time interval of the additional data collected from the data source having high priority, to be longer than that of the additional data collected from the data source having low priority, whereby the additional data may be provided to the user for a longer time.

The display order of the plurality of additional data displayed by the portable device is not limited to the aforementioned embodiments, and may be determined by the collected order of the additional data, the order set by the user, or priority information included in each additional data.

FIG. 6 is a diagram illustrating a method for displaying additional data in accordance with one embodiment of the present invention. As shown in a left side of FIG. 6, the portable device may list a plurality of collected additional data and display the additional data at the same time. The portable device may list the additional data per data source that collects each additional data, and may display details of additional data selected by touch input of the user or the user's face detecting as shown in a right side of FIG. 6.

The portable device may determine the number of additional data displayed at the same time. The portable device may set the number of additional data displayed at the same time to correspond to the timing from the time when the incoming call is received up to the time when the user's face on the portable device is detected. The portable device may increase the number of additional data displayed at the same time if the timing from the time when the incoming call is received up to the time when the user's face is detected is long. Also, the portable device may reduce the number of additional data displayed at the same time if the timing from the time when the incoming call is received up to the time when the user's face is detected is short. In other words, the portable device may increase and reduce the number of additional data displayed at the same time inversely proportional to the timing from the time when the incoming call is received up to the time when the user's face is detected.

The incoming call may be ended by the caller at any time until the user decides whether to answer to the incoming call. Accordingly, the portable device may display several kinds of additional data if the timing from the time when the incoming call is received up to the time when the user's face is detected is long, whereby more additional data may be provided to the user. Also, the portable device may reduce the number of additional data if the timing from the time when the incoming call is received up to the time when the user's face is detected is short, whereby more detailed additional data may be provided to the user.

Figure 6A:
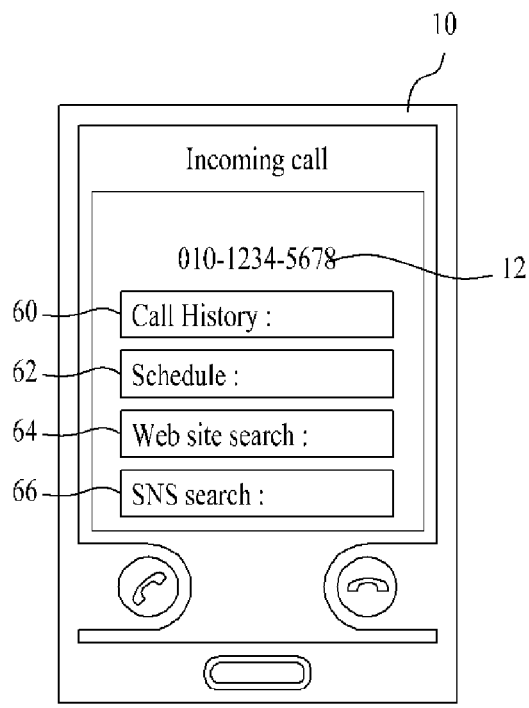
FIG. 6 illustrates a method for displaying additional data in accordance with one embodiment of the present invention.
Figure 6B:
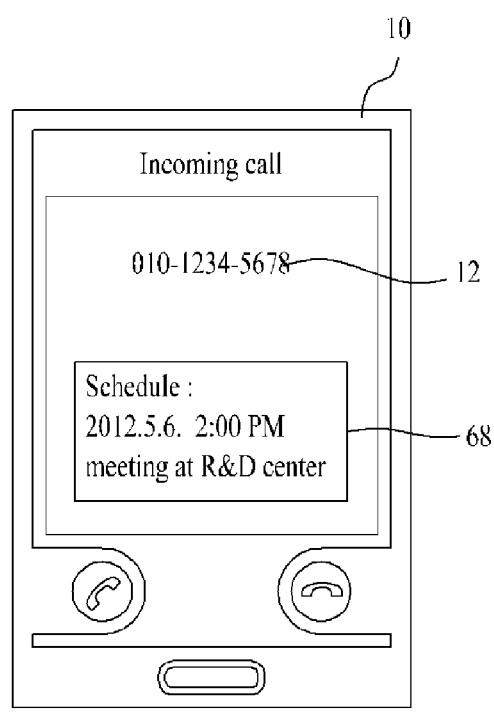

As shown in FIG. 6A, the portable device may list a plurality of additional data per data source that collects each additional data, and may display the plurality of additional data at the same time. For example, a call history 60, a schedule 62, a website search 64 and SNS search 66 may be displayed as the data sources where the additional data are collected. Although not shown in FIG. 6, a brief message of the additional data may be displayed together with the data source. When the user touches a schedule 62 or the user's face is detected as looking at the schedule 62, the portable device may display details of additional data 68 collected from the schedule as shown in FIG. 6B. The portable device may detect one of the listed data sources, which is looked at by the user, by tracking the user's face.

FIG. 7 is a diagram illustrating a method for determining a display order of additional data in accordance with one embodiment of the present invention. When incoming call is received, the portable device may sequentially display a plurality of additional data on caller ID of the incoming call as described above. The portable device may display some of the plurality of additional data corresponding to the caller ID. The plurality of additional data may be displayed in accordance with the searched order or accuracy of search unless there is provided a separate display order. In this case, a problem occurs in that the user needs to wait until additional data desired by the user or additional data providing a basis that decides whether the user answers to the incoming call is displayed.

In this respect, the portable device may use the time when response or rejection to the incoming call is determined. When the first incoming call is received, the portable device may collect and display additional data corresponding to caller ID of the first incoming call. When the user inputs a user input answering to or rejecting the incoming call after identifying the displayed additional data, the portable device may detect the user input answering to or rejecting the incoming call. The portable device may store the additional data displayed at the time when the user input answering to or rejecting the incoming call is detected, as primary data. After the first incoming call ends, when the second incoming call is received from the same caller ID, the portable device may first display the primary data. As a result, the portable device may first display the additional data which has been the basis for answering to or rejecting the first incoming call, among the additional data previously collected for the first incoming call, as the additional data of the second incoming call.

Figure 7A:
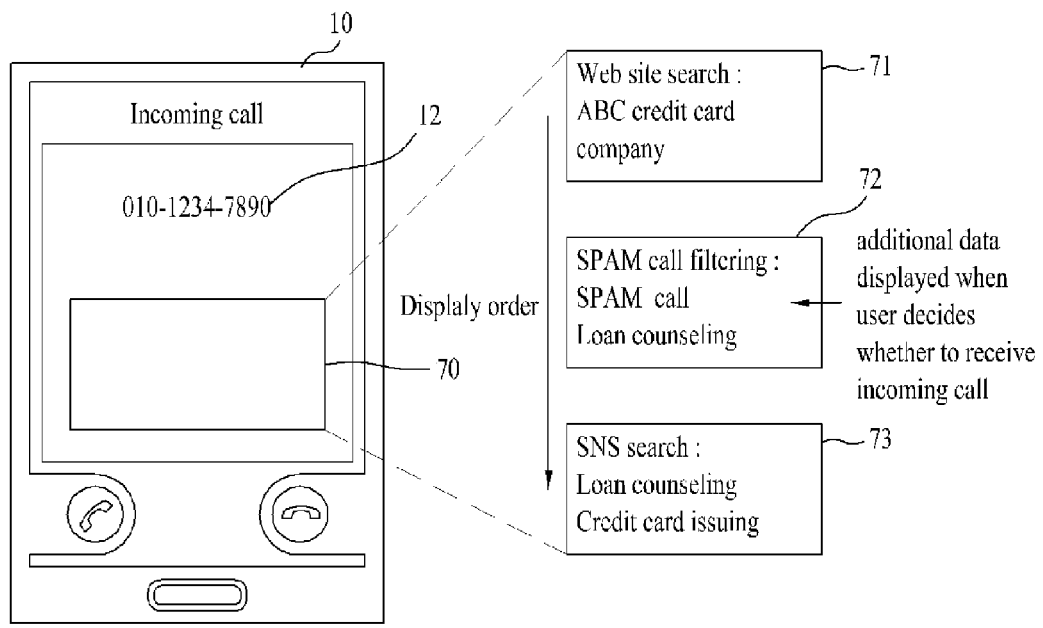
FIG. 7 illustrates a method for determining a display order of additional data in accordance with one embodiment of the present invention.

FIG. 7A illustrates that incoming call is first received from caller ID of '010-1234-7890'. If the additional data of the caller ID do not exist, name or photo of the caller may not be displayed. The portable device may search for the storage unit of the portable device and the network to collect and store the additional data. If the portable device collects additional data from data sources, such as a website, a spam call data base, and SNS, and stores the collected additional data, it may display the additional data collected from each data source in a region 70 where the additional data are displayed. For example, if the portable device collects additional data from the website, the spam call data base, and the SNS, it may sequentially display a website search result 71, a spam call search result 72, and an SNS search result 72 as the additional data. If the user decides to answer to or reject the incoming call at the time when the spam call search result 72 is displayed, the portable device may store the spam call search result 72 as the primary data.

Figure 7B:
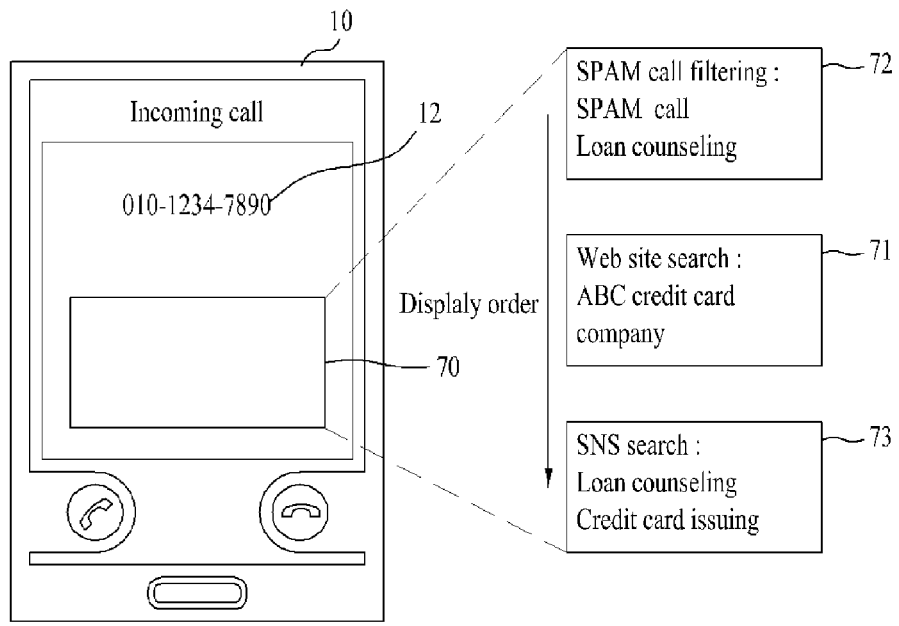

FIG. 7B illustrates that initial incoming call received from caller ID of '010-1234-7890' ends and another incoming call is again received from the same caller ID. The portable device may first display the spam call search result 72 of the collected additional data as the primary data. This is because that the primary data is the additional data that may be a basis for allowing the user to decide to answer to or reject the initial incoming call. Accordingly, the user may first be provided with the additional data that has previously assisted the user in deciding whether to receive the incoming call, and may quickly decide whether to answer to the incoming call. The website search result 71 and the SNS search result 73 may later be displayed in due order. In this respect, the portable device may assist the user in deciding to answer to or reject the incoming call which is being received, by first providing the user with the additional data which has been the basis for allowing the user to decide to answer to or reject the incoming call.

The portable device may decide whether to update the collected additional data, on the basis of the user's face. If an incoming call is disconnected before the user decides to answer to or reject the incoming call, that is, if calling is canceled by a caller, the additional data may be managed depending on whether the user's face have been detected.

When the incoming call is received, the portable device may collect additional data on caller ID of the incoming call and store the collected additional data. When the user's face is detected the portable device may display the collected additional data to provide the user with information on the corresponding caller ID. When the incoming call is disconnected before the user's face is detected, the portable device may store the collected additional data without deleting the corresponding data. When the incoming call is again received from the same caller ID, the portable device may again display the additional data previously collected. In other words, if the collected additional data are not displayed as the user's face is not detected, the portable device may again display the additional data without updating the corresponding data even though the incoming call is again received from the same caller ID. This is because that the additional data previously collected and stored by the portable device is the additional data that has not been provided to the user in view of the user.

Unlike the above case, although the portable device has detected the user's face and displayed a plurality of additional data, if answer or rejection to the incoming call is not determined, the portable device may additionally collect the additional data on the caller ID of the incoming call. After the incoming call is disconnected, the portable device may delete the displayed additional data. When the incoming call is again received from the same caller ID, the portable device may collect new additional data by excluding the additional data, which has been previously displayed, from the display target.

Figure 8:
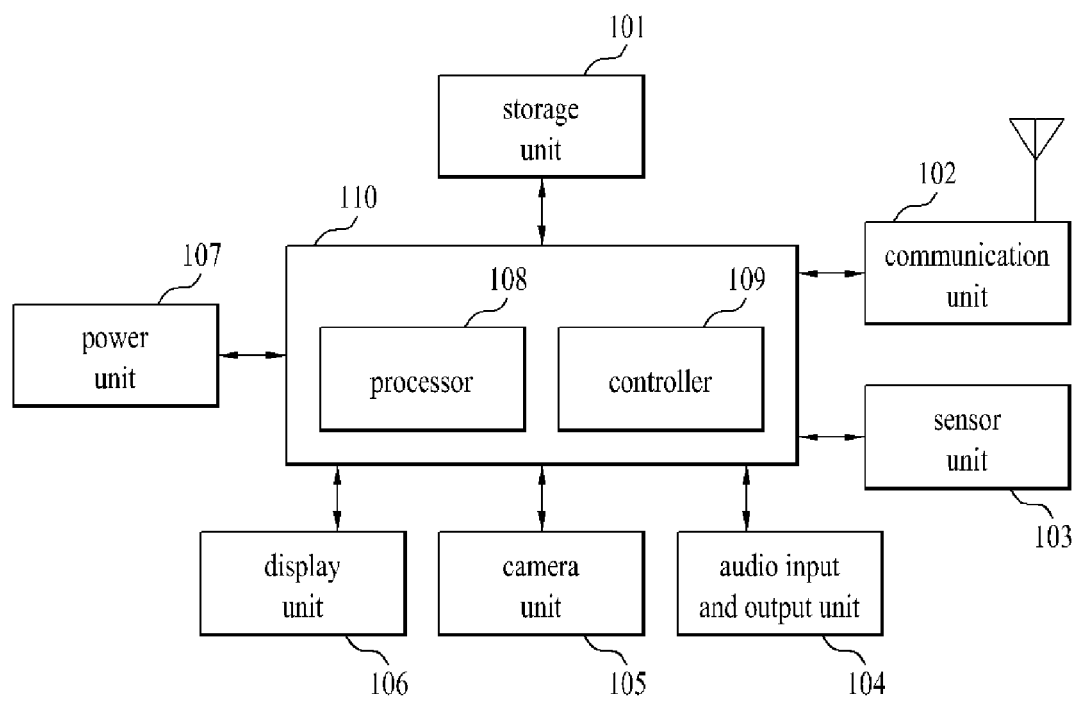
FIG. 8 illustrates a portable device according to one embodiment of the present invention.

FIG. 8 is a block diagram illustrating a portable device according to one embodiment of the present invention. In FIG. 8, the portable device may include a storage unit 101, a communication unit 102, a sensor unit 103, a communication unit 102, a sensor unit 103, an audio input and output unit 104, a camera unit 105, a display unit 106, a power unit 107, a processor 108, and a controller 109.

The storage unit 101 may store various kinds of digital data such as video, audio, photos, moving pictures, and applications. The storage unit 101 means various digital data storage spaces such as a flash memory, a hard disk drive (HDD), and a solid state drive (SSD). The portable device of the present invention may store the additional data collected for the caller ID of the incoming call in the storage unit. The storage unit may form an additional data group per caller ID and store additional data on each caller ID in the additional data group. For example, the storage unit may store the keyword extracted during voice call, the spam call search result collected through the network, the website search result, and the SNS search result as the additional data. Also, the storage unit may store schedule, all history, message history, calendar, and e-mail data, and the additional data may be extracted from these data sources.

The communication unit 102 may perform communication with the external device and transmit/receive data to and from the external device by using various protocols. The communication unit 102 may access an external network through wire or wireless and transmit/receive digital data to and from the external network. The portable device of the present invention may receive an incoming call or send an outgoing call by using the communication unit 102. Also, when the incoming call is received, the portable device may collect additional data on caller ID of the incoming call from a plurality of data sources by connecting the communication unit 102 with the external network.

The sensor unit 103 may transfer input of the user or an environment recognized by the portable device to the controller 109 by using a plurality of sensors provided in the portable device. The sensor unit 103 may include a plurality of sensing means. For example, the plurality of sensing means may include a voice recognition sensor, a video sensor, and a touch sensor.

The sensor unit 103 may detect the user's face by using the video sensor. The sensor unit 103 may detect the user's face by tracking the user's gaze or recognizing the user's face. The sensor unit 103 may detect whether the user looks at the additional data displayed in the display unit by tracking the user's face, and may also detect whether the user looks at other place. Also, the sensor unit 103 may detect an item of the displayed additional data list, which is looked at by the user. The portable device may display details of additional data of the item looked at by the user. Also, the sensor unit 103 may sense an item of the displayed additional data list, which is touched and selected by the user, by using the touch sensor. Also, the sensor unit 103 may extract a keyword of talking messages of the user with the other party through the incoming call and the outgoing call by using the voice recognition sensor. The portable device may store the extracted keyword in the storage unit 101 together with date information of the call history, and may provide the keyword to the user as the additional data. The aforementioned sensors may be included in the device as a separate element, or may be incorporated into at least one or more elements.

The audio input and output unit 104 may include an audio output means such as a speaker and an audio input means such as mike, and may perform audio output of the portable device and audio input to the portable device. When the incoming call is received, the audio input and output unit 104 may be used as an audio sensor. When the incoming call is received, the audio input and output unit 104 of the present invention may output sound to inform the user that the incoming call has been received, and when an answer to the incoming call is determined, the audio input and output unit 104 may receive talking messages of the user and output talking messages of the caller.

The camera unit 105 may take photos and moving pictures. The camera unit 105 may be included in the video sensor of the sensor unit 103. The camera unit 105 may detect whether the user looks at the displayed additional data by detecting the user's face like the aforementioned video sensor. Also, the camera unit 105 may detect an item of the displayed additional data list, which is looked at by the user, whereby the portable device may display additional data of the corresponding item.

The display unit 106 may output an image in a display screen. The display unit 106 may be used as the aforementioned touch sensor when the display is a touch sensitive display. Accordingly, the display unit may detect user input and transfer the detected user input to the controller 109. The display unit 106 may display images in a display panel or control image display. In the present invention, the display unit 106 may display additional data collected for caller ID of the incoming call. Also, if the display unit 106 is used as the touch sensor, it may sense an item of the displayed additional data list, which is selected by the user.

The power unit 107 is a power source connected with a battery in the portable device or an external power source, and may supply the power to the portable device. In the portable device of the present invention, the power unit 107 may be provided optionally.

The processor 108 may execute various applications stored in the storage unit 101 and process data in the portable device. The controller 109 may control the aforementioned units included in the portable device and manage data transmission and reception between the units. The processor 108 and the controller 109 may be provided as one chip 110, and may together perform the aforementioned operations. In this case, the chip may be referred to as the controller 109. In the present invention, when the incoming call is received, the controller 109 may extract caller ID of the corresponding incoming call through the communication unit 102. The controller 109 may collect additional data corresponding to the caller ID extracted through the communication unit. Also, the controller 109 may collect additional data corresponding to the caller ID from call history, text history, schedule, calendar, and photo data, which are stored in the storage unit 101. The controller 109 may store the collected additional data in the storage unit 101. The controller 109 may detect the user's face by controlling the sensor unit 104 or the camera unit 105 and display some of the collected additional data.

Also, as described in FIG. 5, if the timing condition and the user's face condition are satisfied, the controller 109 may control the display unit 106 to display different additional data per predetermined time interval. When an answer or rejection to the incoming call is determined by the user, the controller 109 may store the additional data displayed at the time when the answer or rejection to the incoming call is determined, among a plurality of additional data displayed until the answer or rejection is determined, in the storage unit 101 as the primary data. Also, the controller 109 may first the primary data when the incoming call is again received from the same caller ID. The controller may additionally collect the additional data on the caller ID when the answer or rejection to the incoming call is not determined even after the additional data are displayed.

If the incoming call is disconnected before the user's face is detected, the controller 109 may again display the additional data which are previously collected, instead of collecting the additional data when the incoming call is again received from the same caller ID. In other words, the additional data which are not displayed, among the collected additional data, may be displayed when next incoming call is received from the same caller ID.

FIG. 8 is a block diagram according to one embodiment of the present invention. In FIG. 8, respective blocks are shown to logically identify the elements of the device. Accordingly, the aforementioned elements of the device may be provided as one chip or a plurality of chips in accordance with design of the device.

FIG. 9 is a flow chart illustrating a method for controlling a portable device in accordance with one embodiment of the present invention. The portable device may receive the incoming call by using the communication unit (S10). The portable device may extract caller ID from the received incoming call, wherein the extracted caller ID may be used by the portable device to search for additional data.

The portable device may search whether the extracted caller ID exists in the contact list stored in the portable device (S20). If the caller ID exists in the contact list, the portable device may display the phone number, name and photos stored therein as described in FIG. 1 (S25). The stored phone number may be the same as the caller ID. If there are data on the caller ID directly stored in the contact list by the user, the portable device may quickly display the stored data to provide data desired by the user. After the data stored in the contact list are displayed, the additional data which will be described later may be collected.

If the caller ID does not exist in the contact list, or after the data stored in the contact list are displayed as the caller ID exists in the contact list, the portable device may collect a plurality of additional data on the basis of the caller ID of the incoming call (S30). However, the step of collecting the additional data may be performed in accordance with the embodiments after the portable device recognizes the user's face. The portable device may detect the user's face by tracking the user's gaze or recognizing the user's face. If the user does not look at the portable device, the portable device may not start the step of collecting the additional data, whereby unnecessary data communication may be reduced. In the present invention, in collecting the additional data, the condition for recognizing the user's face may be configured optionally.

The portable device may collect the additional data from an internal data source stored therein. The internal data source may include call history, message history, e-mail, website, schedule and memo, which are stored in the portable device, as described in FIGS. 2 and 3.

The call history may include previous call records with the corresponding caller ID. Also, the call history may include a keyword extracted from the call message with the corresponding caller ID. The portable device may recognize the call message of the user through voice recognition and apply the natural language processing technology to the recognized call message. As a result, the portable device may extract a keyword from the call messages, and may store the extracted keyword together with the call history of the corresponding caller ID. The stored call history and keyword may be displayed as the additional data when the incoming call is again received from the corresponding caller ID. A method for storing the collected additional data through the portable device will be described in detail at next step S40.

The message history may include records of text messages previously sent to and received from the corresponding caller ID. In this case, the messages may include text messages sent and received by short message service (SMS) and multimedia message service (MMS). Also, the message history may include a keyword extracted from the text messages sent to and received from the corresponding caller ID. The sent and received text messages may be deleted by the user. Accordingly, the portable device may recognize the text messages previously sent to and received from the corresponding caller ID, extract the keyword from the recognized text messages, and store the extracted keyword together with the message history of the corresponding caller ID. Accordingly, even though the user deletes the corresponding text message, the stored message history and keyword are not deleted. The method for storing the collected additional data through the portable device will be described in detail at next step S40.

The portable device may collect additional data from the external data source stored in the data base of the network connected with the portable device through wire or wireless. The external data source may include spam call (unwanted call) data base, website, and SNS as described in FIG. 4. The portable device may search for the external data source corresponding to the caller ID of the incoming call and collect the searched external data source.

The portable device may access the spam call data base to search whether the caller ID of the incoming call is matched with caller ID of the spam call. The portable device may collect keywords of the spam call, which are stored together with the caller ID of the spam call if the caller ID of the spam call, which is matched with the caller ID of the incoming call, exists. The keywords of the spam call may include intention or advertisement message of the corresponding spam call. The portable device may collect the additional data on the caller ID of the incoming call by accessing the website. The portable device may extract a keyword from the search result of the corresponding caller ID by using a search engine. The portable device may collect the additional data on the caller ID of the incoming call by accessing the SNS.

After the additional data are collected, the portable device may store the collected additional data therein (S40). The portable device may generate an additional data group per caller ID. The additional data group is a storage unit that may store the plurality of collected additional data per caller ID at the previous step S30. For example, when the incoming call is received from the first caller ID and the additional data are collected, the collected additional data may be stored in the first additional data group. The first caller ID and the first additional data group may be connected with each other. When the incoming call of the first caller ID ends and another information call is received from the second caller ID different from the first caller ID, the portable device may collect the additional data on the second caller ID. The additional data on the second caller ID may be stored in a second additional data group not the first additional data group. As described above, the portable device may generate the additional data group per caller ID to prevent additional data on different caller IDs from coexisting. Also, the portable device may provide the additional data by storing the collected additional data in the additional data group even though the original data are deleted or cannot be searched any more. For example, since the portable device extracts keywords of the call message, text message, e-mail, and memo and stores the extracted keywords in the additional data group, the keywords are not deleted even though the original data of the text message, e-mail and memo are deleted. Accordingly, the portable device may extract the additional data from the additional data group and display the extracted additional data.

Next, the portable device may determine whether the user's face is detected before displaying the additional data (S45). The portable device may detect the user's face by tracking the user's gaze or recognizing the user's face. The portable device may prevent the additional data from being displayed if the user does not look at the display by detecting the user's face. In this case, the user may be provided with the additional data displayed in the portable device without missing. In displaying the additional data, the step of detecting the user's face may be performed optionally in the present invention.

Afterwards, the portable device may display the additional data when the user's face is detected (S50). The portable device may display some of the plurality of collected additional data. The portable device may determine the display order of the additional data in accordance with the collected order of the additional data. Alternatively, the portable device may first display the additional data collected from the internal data source and then display the additional data collected from the external data source. Also, the portable device may determine the display order of the additional data in accordance with priority of each data source as described in FIG. 5.

The portable device may check the timing condition and the user's face condition after displaying the additional data. To this end, the portable device may determine whether the user's face is continuously detected (S60). After the portable device displays the additional data, if the user continues to look at the display unit of the portable device, the portable device may change the additional data displayed per predetermined time interval to other additional data and display the changed additional data (S70). If the user's face is shifted to another place, the portable device may maintain the displayed additional data without change. In other words, if the user's face is not detected, the portable device may temporarily stop display of other additional data per predetermined time interval, and if the user's face is again detected, the portable device may start to display other additional data per predetermined time interval. As described in FIG. 5, the predetermined time interval may be set to correspond to the timing from the time when the portable device receives the incoming call up to the time when the user's face on the portable device are detected.

Also, if the user desires to look at the displayed additional data for the predetermined time interval or more, the portable device may maintain the display state without changing the displayed additional data. If the user inputs an input for holding the displayed additional data by touching the display unit, the portable device may maintain the displayed additional data even though the timing condition and the user's face condition are satisfied. Also, the portable device may determine the display order of the additional data in accordance with the priority of each data source as described in FIG. 5.

The portable device may display the plurality of collected additional data until the user decides whether to answer to the incoming call (S80). The portable device may additionally collect the additional data on the caller ID and display the collected additional data if the user does not decide whether to answer to the incoming call even after all the collected additional data are displayed. If the user does not decide whether to answer to the incoming call even after receiving the displayed additional data, the portable device may collect new additional data and display the collected additional data. The portable device may repeatedly display the collected additional data instead of additionally collecting additional data.

If the incoming call is disconnected after the user's face is detected, the portable device may reuse the collected additional data. After the portable device collects the additional data on the caller ID as the incoming call is received, if the incoming call is disconnected before the user's face is detected, the collected additional data are not displayed. Since the additional data which are not displayed have been provided to the user, the data may be reused by the portable device at the time when the previous incoming call is received when the incoming call is received from the same caller ID. The portable device may again display the collected additional data at the time when the previous incoming call is received.

If the user decides whether to answer to the incoming call, the portable device may detect the user input answering to or rejecting the incoming call (S80). The portable device may store the additional data displayed at the time when answer or rejection to the incoming call is determined, as the primary data. The stored primary data may first be displayed when the incoming call is again received from the same caller ID after the incoming call ends. In other words, at the step (S45) of detecting the user's face and the step (S50) of displaying some of the plurality of additional data, the portable device may first display the primary data of the previous incoming call received from the same caller ID. Since the additional data displayed at the time when answer or rejection to the incoming call is determined serve as the basis for determining whether the user decides to answer to the incoming call, the portable device may first display the corresponding additional data, whereby the user may quickly decide whether to answer to the incoming call.

Also, as described above, when the user input answering to the incoming call is detected, the portable device may recognize a call message of the user through voice recognition, extract keywords and store the extracted keywords together with the call history as the additional data. After the incoming call ends, when the incoming call is again received from the same caller ID, the portable device may first display the additional data of the call history and the keywords stored therein, prior to the other additional data. The portable device may remind the user of the previous call messages by providing the keywords of the previous call messages to the user.

FIG. 10 is a flow chart illustrating a method for controlling a portable device in accordance with another embodiment of the present invention. The portable device may receive the first incoming call by using the communication unit (S110). The portable device may extract caller ID from the received first incoming call.

The portable device may detect the user's face before collecting the additional data on the caller ID (S120). In other words, if the user does not look at the portable device, the portable device may not start the step of collecting the additional data, whereby unnecessary data communication may be reduced. In the present invention, the step of detecting the user's face before collecting the additional data may be performed optionally.

After detecting the user's face, the portable device may collect the plurality of additional data on the basis of the caller ID of the first incoming call (S130). The portable device may collect the additional data from the internal data source stored therein. The internal data source may include call history, message history, address, e-mail, website, schedule and memo, which are stored in the portable device, as described in FIGS. 2 and 3. The call history may include previous calling records with the corresponding caller ID. Also, the call history may include a keyword extracted from the call message with the corresponding caller ID. The message history may include records of text messages previously sent to and received from the corresponding caller ID. Also, the message history may include a keyword extracted from the text messages sent to and received from the corresponding caller ID.

The portable device may collect additional data from the external data source stored in the data base of the network connected with the portable device through wire or wireless. The external data source may include spam call (unwanted call) data base, website, and SNS as described in FIG. 4. The portable device may search for the external data source corresponding to the caller ID of the first incoming call and collect the searched external data source.

The portable device may determine whether the user's face is detected before displaying the additional data (S140). The portable device may prevent the additional data from being displayed if the user does not look at the display. In this case, the user may be provided with the additional data displayed in the portable device without missing. In displaying the additional data, the step of detecting the user's face may be performed optionally in the present invention.

Afterwards, the portable device may display the additional data if the user's face is detected (S150). The portable device may display some of the plurality of additional data. The portable device may determine the display order of the additional data in accordance with the collected order of the additional data. Alternatively, the portable device may first display the additional data collected from the internal data source and then display the additional data collected from the external data source. Also, the portable device may determine the display order of the additional data in accordance with priority of each data source as described in FIG. 5.

The portable device may check the timing condition and the user's face condition after displaying the additional data. To this end, the portable device may determine whether the user's face is continuously detected (S160). After the portable device displays the additional data, if the user's face looking at the display unit of the portable device is continuously detected, the portable device may change the additional data displayed per predetermined time interval to other additional data and display the changed additional data. As described in FIG. 5, the predetermined time interval may be set to correspond to the timing from the time when the portable device receives the incoming call up to the time when the user's face on the portable device are detected.

If the user's face is shifted to another place, the portable device may maintain the displayed additional data without change. In other words, if the user's face is not detected, the portable device may temporarily stop display of other additional data per predetermined time interval, and if the user's face is again detected, the portable device may start to display other additional data per predetermined time interval.

If the user desires to look at the displayed additional data for the predetermined time interval or more, the portable device may maintain the display state without changing the displayed additional data. If the user inputs an input for holding the displayed additional data by touching the display unit, the portable device may maintain the displayed additional data even though the timing condition and the user's face condition are satisfied. Also, the portable device may delay change of the additional data by recognizing voice command or gesture.

If the user's face is continuously detected, the portable device may change the displayed additional data to other additional data and display the changed additional data (S170). The portable device may display the plurality of collected additional data until the user decides whether to answer to the incoming call. The portable device may additionally collect the additional data on the caller ID and display the collected additional data if the user does not decide whether to answer to the incoming call even after all the collected additional data are displayed. If the user does not decide whether to answer to the incoming call even after receiving the displayed additional data, the portable device may collect new additional data and display the collected additional data. The portable device may repeatedly display the collected additional data instead of additionally collecting additional data.

If the first incoming call is disconnected before the user's face is detected, the portable device may reuse the collected additional data. After the portable device collects the additional data on the caller ID as the first incoming call is received, if the first incoming call is disconnected before the user's face is detected, the collected additional data are not displayed. Since the additional data which are not displayed have been provided to the user, the data may be reused by the portable device at the time when the first incoming call is received if the second incoming call is received from the same caller ID. The portable device may again display the collected additional data at the time when the first incoming call is received.

If the user decides whether to answer to the incoming call while the additional data are being displayed, the portable device may detect the user input answering to or rejecting the first incoming call (S180). The portable device may store the additional data displayed at the time when the user input answering to or rejecting the first incoming call is detected, as the primary data as described in FIG. 7 (S190). The primary data serve as the basis for determining whether the user decides to receive the incoming call.

After the first incoming call ends, when the second incoming call is received from the same caller ID, the portable device may first display the stored primary data (S200). In other words, when the second incoming call is received, the portable device may display the stored primary data before collecting the additional data on the caller ID, whereby the user may quickly decide whether to answer to the incoming call.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for controlling a portable device, the method comprising:
   receiving an incoming call;
   detecting a user's face on the portable device;
   displaying additional data on the incoming call when the user's face is detected, wherein the additional data are some of a plurality of data collected from a plurality of data sources corresponding to caller ID of the incoming call;
   displaying other additional data included in the collected data per predetermined time interval when the user's face is continuously detected; and
   detecting a user input for answering or rejecting the incoming call.

2. The method according to claim 1,
   wherein the additional data are displayed in accordance with a display order determined by:
   accumulating the number of times for collecting primary data from each data source respectively,
   determining priority of the data sources in the order of the higher accumulated values, and
   applying the priority of the data sources to the data collected from each data source,
   wherein the primary data are the additional data displayed at the time when the user input for answering or rejecting the incoming call is detected.

3. The method according to claim 1, further comprising: when the user input for answering the incoming call is detected,
   recognizing a call message of the user through voice recognition;
   storing keywords extracted from the voice-recognized call message; and
   displaying the stored keywords as the additional data if the next incoming call is received from the caller ID.

4. The method according to claim 1, wherein the additional data include a history of text messages with the caller ID, and keywords extracted from the text messages.

5. The method according to claim 1, wherein the displaying other additional data per predetermined time interval includes temporarily stopping the display of the other additional data when the user's face is not detected any more, and starting the display of the other additional data when the user's face is detected again.

6. The method according to claim 1, wherein the collected data include data collected from a storage unit in the portable device or a network connected with the portable device.

7. The method according to claim 6, wherein the collected data include data collected by:
   accessing a data base, which stores caller IDs and keywords of spam calls, through the network, and
   extracting the caller IDs and the keywords of the spam calls, which are matched with the caller ID of the incoming call.

8. The method according to claim 6, wherein the collected data include data collected from information drafted by another user for the caller ID of the incoming call by searching for a social network service through the network.

9. The method according to claim 1, wherein the predetermined time interval is determined based on a time from receiving the incoming call up to detecting the user's face.

10. The method according to claim 1, wherein the displaying the additional data includes simultaneously displaying two or more of the data collected from the plurality of data sources, and the number of the simultaneously displayed additional data is determined based on a time from receiving the incoming call up to detecting the user's face.

11. The method according to claim 1, wherein the detecting the user's face includes tracking the user's gaze or recognizing the user's face.

12. A portable device comprising:
    a communication unit configured to transmit and receive digital data over a network;

a storage unit configured to store the digital data;
a sensor unit configured to detect a user's face on the portable device;
a display unit configured to display the digital data; and
a controller configured to control the units,
wherein the portable device is configured to:
receive an incoming call,
detect the user's face on the portable device,
display additional data on the incoming call when the user's face is detected, the additional data being some of a plurality of data collected from a plurality of data sources corresponding to caller ID of the incoming call,
display other additional data included in the collected data per predetermined time interval when the user's face is continuously detected, and
detect a user input for answering or rejecting the incoming call.

13. The portable device according to claim 12,
wherein the portable device displays the additional data in accordance with a display order determined by:
accumulating the number of times for collecting primary data from each data source,
determining priority of the data sources in the order of the higher accumulated values, and
applying the priority of the data sources to the data collected from each data source,
wherein the primary data are the additional data displayed at the time when the user input answering to or rejecting the incoming call is detected.

14. The portable device according to claim 12, wherein, when the user input answering to the incoming call is detected, the portable device further configured to:
recognize a call message of the user through voice recognition,
store keywords extracted from the voice-recognized call message, and
display the stored keywords as the additional data if the next incoming call is received from the caller ID.

15. The portable device according to claim 12, wherein the additional data include a history of text messages with the caller ID, and keywords extracted from the text messages.

16. The portable device according to claim 12, wherein the portable device temporarily stops displaying the other additional data per predetermined time interval when the user's face is not detected any more, and starts to display the other additional data when the user's face is detected again.

17. The portable device according to claim 12, wherein the collected data include data collected from the storage unit in the portable device, or the network connected with the portable device.

18. The portable device according to claim 17, wherein the collected data include data collected by:
accessing a data base, which stores caller IDs and keywords of spam calls, through the network, and
extracting the caller IDs and the keywords of the spam calls, which are matched with the caller ID of the incoming call.

19. The portable device according to claim 17, wherein the collected data include data collected from information drafted by another user for the caller ID of the incoming call by searching for a social network service over the network.

20. The portable device according to claim 12, wherein the predetermined time interval is determined based on a time interval from receiving the incoming call up to detecting the user's face.

21. The portable device according to claim 12, wherein the portable device simultaneously displays two or more of the plurality of data collected from the plurality of data sources, and the number of the simultaneously displayed additional data is determined based on a time from receiving the incoming call up to detecting the user's face.

22. The portable device according to claim 12, wherein the user's face is detected by tracking the user's gaze or recognizing the user's face.

23. A portable device comprising:
a communication unit configured to transmit and receive digital data over a network;
a storage unit configured to store the digital data;
a sensor unit configured to detect a user's face on the portable device;
a display unit configured to display the digital data; and
a controller configured to control the above units,
wherein the portable device is configured to:
receive a first incoming call,
detect the user's face on the portable device,
display additional data on the first incoming call when the user's face is detected, the additional data being some of a plurality of data collected corresponding to caller ID of the incoming call,
display other additional data included in the collected data per predetermined time interval when the user's face is continuously detected,
detect a user input for answering to or rejecting the incoming call,
store the data displayed at the time when the user input is detected as primary data, and
display the primary data when a second incoming call is received from the caller ID after the first incoming call ends.

24. A method for controlling a portable device, the method comprising:
receiving a first incoming call;
detecting a user's face on the portable device;
displaying additional data on the first incoming call when the user's face is detected, the additional data being some of a plurality of data collected corresponding to caller ID of the first incoming call;
displaying other additional data included in the collected data per predetermined time interval when the user's face is continuously detected;
detecting a user input for answering or rejecting the first incoming call;
storing the data displayed at the time when the user input is detected, as primary data; and
displaying the primary data when a second incoming call is received from the caller ID after the first incoming call ends.

* * * * *